Figure 1:
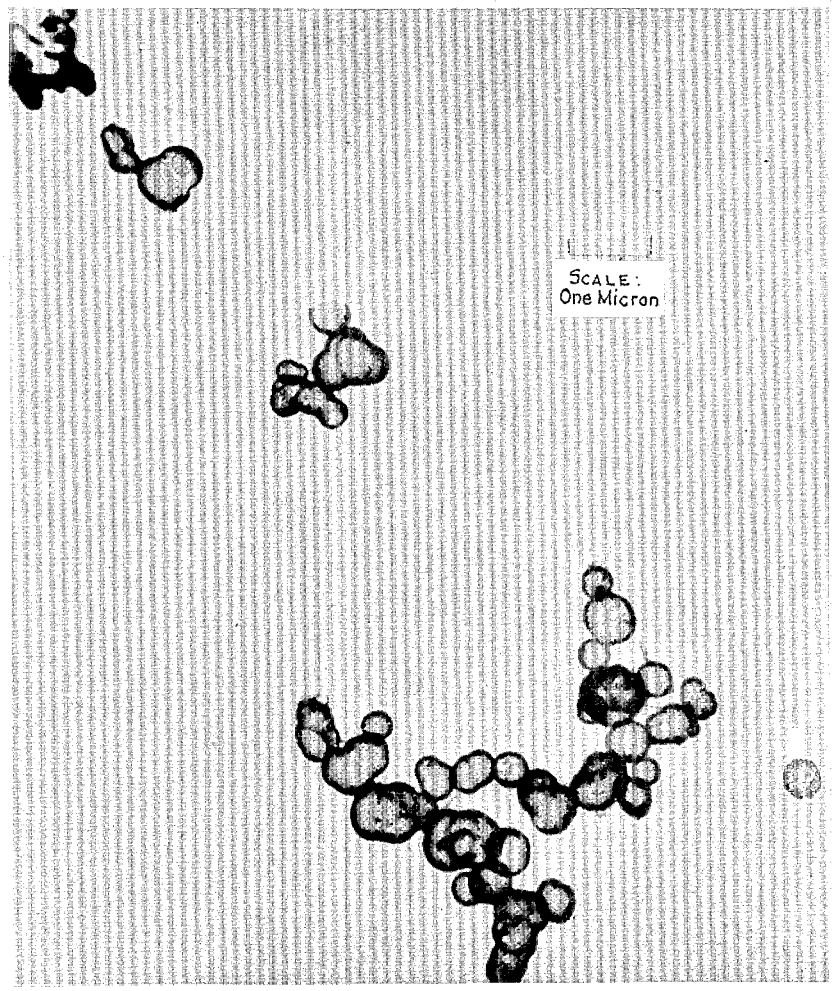

Patented Dec. 26, 1950

2,535,659

UNITED STATES PATENT OFFICE 2,535,659

AMORPHOUS SILICA AND PROCESS FOR MAKING SAME

Harold I. Wolff, Houston, Tex., assignor to Shell Development Company, San Francisco, Calif., a corporation of Delaware Application April 1, 1947, Serial No. 738,699

11 Claims. (Cl. 23—182)

This invention relates to a new form of amorphous silica and to a process of producing amorphous silica in fine particles. More particularly, the amorphous silica according to this invention is in the form of small, hollow globular particles, generally of spherical or spheroidal shape, with comparatively thin walls of low porosity. These particles differ from crystalline forms in their physical properties, and from amorphous particles of comparable size, known heretofore, which are not hollow.

The small, hollow amorphous silica globules described in this specification may, for example, be used as a filler for rubber, replacing carbon black and various solid amorphous silica used heretofore; when so used they exhibit excellent rubber nerve killing properties, as well as having high bulking and heat insulating values. These particles may also be used as heat insulating materials, either with a suitable binder or loosely retained between walls. The present invention is not, however, restricted to any particular utilization of the globules.

The globular particles may be produced by various processes, usually involving the cooling or condensation of silica from an inert, heated atmosphere, in which silica has been vaporized or formed by oxidation of silicon monoxide. One specific method of forming these globules is described herein and illustrated in the drawings.

The preferred method producing these hollow particles comprises the steps of heating siliceous material, such as clay or sand, under conditions causing the vaporization of silicon in a lower form than the dioxide, i. e., either elemental silicon or silicon monoxide or a mixture thereof, and oxidation of the vapors to form the small globular particles of silica. These particles may then be rapidly cooled to prevent transformation to the crystalline form.

This process may, for example, be carried out by heating the siliceous material in an electric furnace together with a reducing agent, preferably a carboniferous reducing agent, particularly carbon, such as graphite or various amorphous forms. Other carbon-containing materials, such as hydrocarbons, which are converted to form hydrogen and carbon at the temperature involved, may also be used, either alone or in combination with elemental carbon. The heating is carried out in an inert atmosphere, preferably a reducing atmosphere, such as hydrogen. The term "inert" is used herein to indicate an atmosphere which is inert with respect to silicon at the temperature of the process, and it should be noted that an atmosphere containing appreciable amounts of nitrogen is not inert under these conditions, due to the formation of silicon nitrides. The temperature should be sufficiently high to result in a sufficient partial pressure of silicon in a less oxidized form than silica, viz., elemental silicon or silicon monoxide, to cause the vaporization thereof. Vaporization may be promoted by operating at a vacuum, such as at an absolute pressure of 5 lbs. per sq. inch, but satisfactory results may be obtained at higher pressures, up to and even somewhat above atmospheric. The inert atmosphere containing vaporized silicon is continuously removed from the vaporization zone to promote the further vaporization, and oxidized in any suitable manner, for example, by quenching with water, steam, flue gases. Steam oxidation is preferred because of the relatively greater safety, but other oxidizing agents, such as air, and $CO_2$ may be used. The oxidation results in the formation of silica which condenses in the form of small, hollow globules, dispersed in the atmosphere. The resulting dispersion is preferably rapidly cooled, to prevent transformation to the crystalline form, although this may be omitted under certain conditions, e. g., when the steam quenching results in a temperature which is sufficiently low, or when the rate of flow of the atmosphere in the apparatus is low enough to cause cooling by radiation or convection. The hollow, globular particles are then separated from the gas in a cyclone separator or a bag filter, exercising care to avoid breaking the relatively fragile shells.

This process of producing silica of small particle sizes may also be applied to produce particles which are not hollow.

As was indicated above, the heating may be effected under any conditions causing the reduction of silica, even without carbon, inasmuch as hydrogen and carbon monoxide are each capable of reducing the silica. While I may practice the process in this manner, the rate of reduction proceeds slowly except at very high temperatures, and I prefer to employ carbon, at least equivalent to half of the silica to be reduced, and usually equivalent to reduce all of the silica.

As regards temperatures, while temperatures as low as 2200° F. are operative to vaporize very small quantities of silicon, the vapor pressure of silicon and its resulting concentration in the inert atmosphere at such temperatures are so low that an excessive quantity of inert gas must be passed through the furnace to obtain a given yield. For example, the quantity of gas required is about one hundred times as great at 2200° F. as at 3600° F. For this reason it is advantageous to operate not lower than 2800° F. and, preferably, between 3600° and 4100° F. The temperature should preferably not exceed about 4200° F. because stable silica carbide is formed at such higher temperatures; however this limit may be exceeded when reducing agents other than carboniferous material are employed.

The exact chemical reactions involved in this process have not been established with certainty and I do not desire to limit myself to any theory as to the reactions taking place or the mechanism by which the hollow globules are formed. For example, while it is known that silicon is vaporized, it is not certain that it is elemental silicon or the unstable monoxide. However, to aid in describing the process, the following is presented as one possible explanation of the process. It is postulated that elemental silicon is vaporized during the heating step, being reduced from silica by one or by a combination or two or more of the following reactions:

$$SiO_2 + 2C = Si + 2CO \quad (1)$$
$$SiO_2 + 2CO = Si + 2CO_2 \quad (2)$$
$$SiO_2 + 2H_2 = Si + 2H_2O \quad (3)$$

When the charge contains $Al_2O_3$ or other aluminous material, the alumina remains as the furnace residue, and may be recovered from the furnace as corundum, provided that the reduction of silica has been carried to completion and that no excess of carbon remains. The alumina, however, does not otherwise enter into the above reactions in any large degree.

Similarly, the exact mechanism of the formation of hollow globules is not known. One possible explanation is that the silica, formed upon oxidation of vaporized silicon, condenses around minute particles of carbon or other solids which are entrained with the vapors removed from the heated charge.

Figure 2:
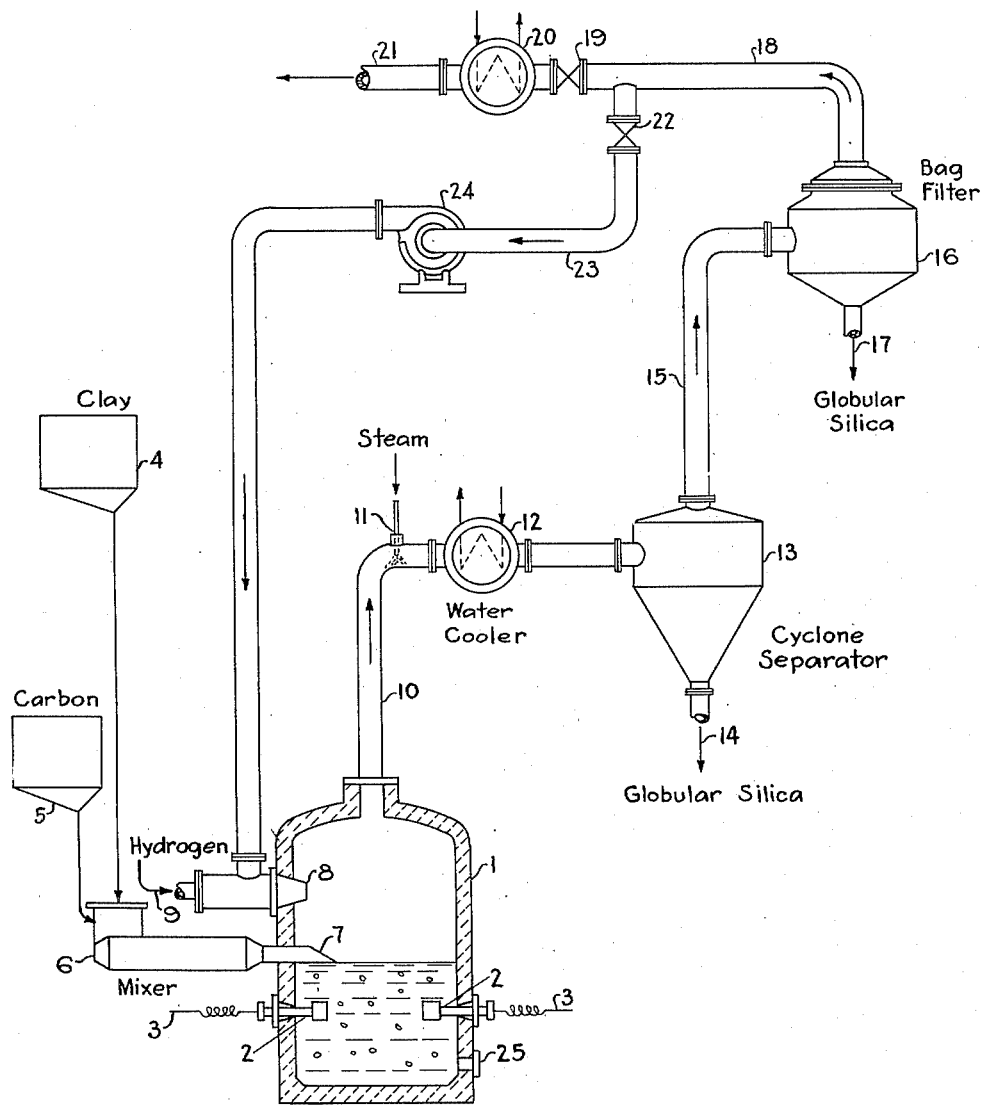

The method and resulting product will be better understood from the following detailed description, taken together with the accompanying drawings, which form a part of this specification, and wherein:

Fig. 1 is an electron microphotograph of the hollow globular particles, to the scale indicated thereon, the original photograph having a total magnification of 20,200; and Fig. 2 is a schematic flow diagram of the steps involved in the preferred method.

Referring to Fig. 2, I represents an electric furnace heated by carbon electrodes 2 supplied with power by leads 3 from a source, not shown. Siliceous material and carbon are supplied from sources 4 and 5 and intimately mixed and preheated in batch mixer 6. The siliceous material may, for example, be clay containing 25% alumina and 75% silica, although alumina-free sand or clay containing more or less than 25% alumina can also be used. For maximum utilization of the freed material it is desirable to use carbon in the proper amount to reduce the silica in accordance with Equation 1, although a deficiency can, if desired, be used, relying upon the reducing gas to effect further reduction in accordance with Equations 2, 3, or 2 and 3. When hydrocarbon gas is used for the process, it is decomposed, causing the formation of carbon, which may supplement the carbon feed from source 5.

The preheated charge is fed into the furnace at 7, either in batches or continuously and a reducing atmosphere is maintained above the charge by introducing at 8, via a line 9, a continuous stream of hydrogen or a mixture of hydrogen and hydrocarbons, or hydrocarbon gas, such as methane, ethane, or natural gas, which is decomposed with the formation of hydrogen and carbon within the furnace. The gas may be optionally discharged into the molten charge beneath its surface. As a specific example, with a furnace temperature of 4100° F., 450 standard cubic feet of hydrogen gas per minute may be used when charging 14.3 tons per day of clay containing 25% silica and 4.4 tons per day of carbon. The temperature is preferably between 3600° and 4100° F., although somewhat lower temperatures, for example, down to 2800° F. and even lower can be used. When temperatures below 2800° F. are employed excessive quantities of hydrogen gas are required and the process becomes uneconomical. The temperature should preferably be maintained below 4200° F.

The gases are continuously removed from the furnace through a vapor line 10. Steam is introduced at 11 to quench the hot vapors and cause the oxidation of silicon and the formation of globular silica particles. The partially cooled vapors, which may, for example, be at a temperature between about 1000 and 2300° F., and carrying silica in suspension are further cooled by flow through a water cooler 12, wherein they are rapidly cooled, preferably to a temperature below about 2200° F., such as 600° F. or even lower.

The cooled vapors are then flowed into any suitable separator, such as an enlarged cyclone separator 13 from which the hollow, amorphous, globular silica particles are withdrawn at the bottom via a line 14. The vapors are passed through line 15 into a bag filter 16 where additional quantities of silica are separated and withdrawn via line 17. These particles are usually smaller than those withdrawn through line 14, but the two products may be combined, if desired. The warm gas from the filter, consisting predominantly of hydrogen and carbon monoxide, is withdrawn through line 18 and may be further passed via valve 19 and cooled in a heat exchanger 20 to recover its heat content before being discharged from the process at 21.

Numerous modifications in the process are possible. For example, it is possible to recycle all or a portion of the gas via valve 22, line 23 and blower 24. Recycling all of the gas would tend to build up the concentration of $CO_2$ and CO therein, and to maintain oxidizing conditions within the furnace. For this reason it is desirable to draw off continuously at least a portion of the gas at 21.

The operation of the furnace may be batch or continuous. In the latter case the charge from the mixer 6 is fed continuously or intermittently and the molten residue, containing non-volatile impurities, is withdrawn intermittently through a tap hole 25.

The amorphous silica withdrawn from the process at 14 and 17 are of varying sizes, usually between about 200 and 1000 millimicrons outside diameter, although larger particles as large as 5 microns and smaller particles down to 100 millimicrons may be produced. When by-product carbon from methane cracking was used, most of the particles had diameters between 400 and 600 millimicrons, and the shell walls were about 30 millimicrons in thickness. Fig. 1 is an electron microphotograph of globules of this size, the scale is indicated by the line on the photograph, the two graduation marks perpendicular to the scale line being a scale distance of 1 micron apart.

The hollow, microglobular amorphous silica according to this invention has a high apparent density, i. e., the walls are glassy and relatively free from pores. They can, therefore, be readily incorporated into rubber. On the other hand, they possess excellent bulking properties because the rubber does not enter the interior of the globules, and rubber containing these particles will have a low density. Such compositions containing rubber and the hollow amorphous silica is claimed in a copending application of Richard E. Wright, Serial No. 738,743, filed April 1, 1947, now abandoned.

I claim as my invention:

1. A process for producing amorphous silica comprising the steps of heating siliceous material together with a reducing agent in a heating zone at a temperature above about 2800° F. to vaporize silicon in a reduced form lower than the dioxide, continuously sweeping the heated mixture with an inert atmosphere to remove the vaporized silicon from the space above the heated mixture, oxidizing the vaporized silicon while in said inert atmosphere to form silica and rapidly cooling the silica to a temperature below about 2000° F.

2. Amorphous silica in the form of hollow globes having continuous walls and external diameters between about 100 and 5,000 millimicrons produced by the process according to claim 1.

3. Amorphous silica in the form of hollow globes having continuous walls and diameters between about 200 and 1000 millimicrons produced by the process according to claim 1.

4. Amorphous silica according to claim 3 having thin walls of the order of 30 millimicrons.

5. The process according to claim 1 wherein the reducing agent comprises amorphous carbon, formed by admitting the hydrocarbon gas into the heating zone.

6. The process according to claim 1 in which the oxidation is effected by adding steam to the inert atmosphere containing vaporized silicon after removal from the heating zone.

7. The process according to claim 1 in which the temperature of heating is between 3600° F. and 4100° F.

8. A process for producing amorphous silica in the form of small hollow globes, comprising the steps of heating siliceous material together with carboniferous material at a temperature between about 2800° F. and 4200° F., removing reduced siliceous material vaporized from the heated mixture by continuously sweeping the mixture with an inert atmosphere consisting predominantly of hydrogen, oxidizing the reduced siliceous material while mixed in said inert atmosphere to form silica, and immediately rapidly cooling the silica to a temperature below about 2000° F.

9. The process according to claim 8 in which the initial material consists predominantly of clay and amorphous carbon.

10. The process according to claim 8 in which the initial material consists predominantly of sand and amorphous carbon.

11. The process according to claim 8 in which the temperature of heating is between 3600° F. and 4100° F.

HAROLD I. WOLFF.

REFERENCES CITED

The following references are of record in the file of this patent:

UNITED STATES PATENTS

| Number | Name | Date |
|---|---|---|
| 875,286 | Potter | Dec. 31, 1907 |
| 875,674 | Potter | Dec. 31, 1907 |
| 875,675 | Potter | Dec. 31, 1907 |
| 886,636 | Potter | May 5, 1908 |
| 886,637 | Potter | May 5, 1908 |
| 908,131 | Potter | Dec. 29, 1908 |
| 2,093,454 | Kistler | Sept. 21, 1937 |
| 2,249,767 | Kistler | July 22, 1941 |
| 2,384,944 | Marisic | Sept. 18, 1945 |
| 2,428,178 | Reik et al. | Sept. 30, 1947 |